Nov. 5, 1929.  E. P. JONES  1,734,213
MOTOR CAR BODY
Filed Dec. 23, 1926
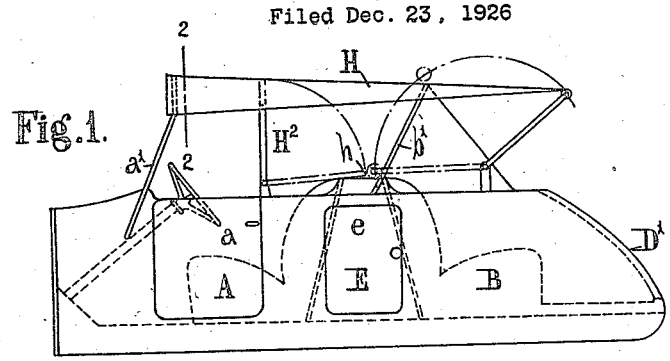
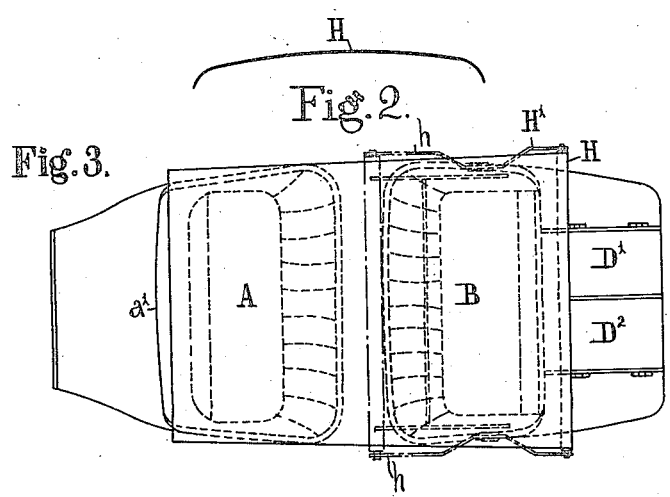
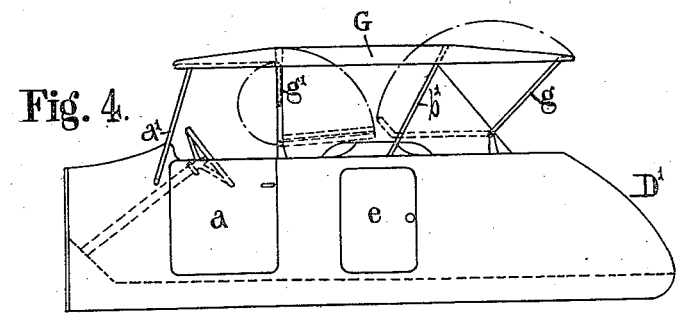
INVENTOR
E. Peter Jones.
BY
Lowden O'Brien
ATTORNEY Patented Nov. 5, 1929

1,734,213

UNITED STATES PATENT OFFICE

EDWARD PETER JONES, OF CHESTER, ENGLAND

MOTOR-CAR BODY

Application filed December 23, 1926, Serial No. 156,736, and in Great Britain November 5, 1926.

This invention relates to bodies for motor cars and is designed to provide a body which will give greater opportunities for observation, greater freedom from anxieties arising from road traffic and greater safety from the perils of the road to the occupants of the rear seat, and will provide better facilities for the conveyance of luggage, parcels and the like.

In the construction of car bodies it is common practice to place the rear seats some distance behind the front seats but facing in a forward direction with a space between and to dispose entrance doors to the rear seats at one or both sides of the body.

According to this invention the position of the rear seat is reversed with the back of the seat adjacent to the back of the front seat, an entrance door is placed at the rear of the body, and a compartment for luggage is provided between the front and back seat with a small door at one or both sides to give access to the compartment.

In the open or touring car the rear of the body is preferably inclined and the back entrance is provided with twin doors opening, preferably simultaneously, to right and left to give easy access to the rear seats. A hood is mounted to cover both front and rear seats formed of a spring roller blind carried by two arms, lying when not in use between the two seats, but when required swung up to the rear when the roller blind is drawn forward and attached to the front and rear screens and an intermediate support, in such a way that the sides are turned downwards and form an arched roof over the passengers, or the hood may fold both from the front and rear towards the centre of the body, and when folded lie between the two seats.

The invention will be fully described with reference to the accompanying drawings.

Fig. 1. is a side elevation of open touring car showing roller blind hood in use.

Fig. 2 is a section of hood when in use on line 2—2 on Fig. 1.

Fig. 3 is a plan of open touring car showing roller blind hood in use and back entrance doors.

Fig. 4 is a side elevation of open touring car showing another form of hood.

The front seat A and front part of the body with doors $a$ and wind screen $a^1$ are of ordinary construction.

The rear seat B is reversed to face towards the rear of the body with the back $b$ of the seat towards the driver and adjacent to the back of the front seat A. The body is carried rearwards round the seat. Between the seats a compartment E is formed adapted to carry luggage, tools, parcels, dogs or the like and the body is provided with a door $e$ at one or both sides to give access thereto. Twin doors $D^1$, $D^2$ are fitted at the back opening to right and left to give easy access, said doors extending partially over the compartment. The body is fitted with a hood H extending forward over the front seat A and over the rear seat B formed of a spring roller blind mounted on two arms $H^1$. When the hood H is not in use it lies between the two seats the arms $H^1$ being swung forward to the position $h$. When the hood is required the arms are swung back to position L, the roller blind being then drawn forward and attached to the front screen $a^1$, the intermediate support $H^2$ and the rear screen $b^1$ in such a way that the sides are turned down and form an arched hood over the passengers. The rear screen is designed to partially enclose the compartment, being preferably formed of walls of transparent material, the rear wall extending across the back of the compartment and sloping over the same, the sides of the screen extending along the side walls of the compartment and formed so as to join with the sloped rear wall. Alternatively the body is fitted (Fig. 4) with a double hood G extending forward over the front seat A and backward over the rear seat B mounted on arms $g$, $g^1$ and is arranged to fold backwards and forwards towards the centre between the two seats, so that when out of use it lies folded between the two seats. Side curtains or screens of transparent material may be fitted as desired, and a transverse wind screen $b^1$ to protect the occupants of the seat B. A transparent curtain may be suspended at the rear of the hood if desired.

The arrangement of the seating makes for the best possible use of the disposable space in the body. As side entrances for the rear seats cannot be arranged, the door is at the back, and this allows the body to be widened out to the full width of the wings, and in this way both back and front seats are made wide enough for three persons.

The length of the chassis also allows space enough for a locker or compartment extending across the body, between the back and front seats, with door on both sides, where luggage or parcels are easily stowed immune from damp and dirt—impossible on any other form of body. This compartment is large enough for six good sized suitcases, and the weight is carried where it should be low down and between the axles.

What I claim as my invention and desire to protect is:—

1. As a new article of manufacture, a motor car comprising a body of the open type provided with a protected observation compartment in the rear thereof, an observation seat for said compartment adapted to face the rear and substantially abut the conventional front seat of the car, a rigid screen sloping over the observation compartment adapted to extend across the back and around the sides of the observation seat and partially enclose the compartment, a centrally collapsible top adapted to extend over the observation compartment and the front seat of the body designed to fit between the observation compartment and the front seat in collapsed position, and a pair of doors extending forwardly and upwardly over the compartment to protect the occupants and provide an entrance for the compartment.

2. The device as claimed in claim 1, and in which the rigid screen consists of a shield of transparent material partially enclosing the observation compartment, without obstructing the view.

In testimony whereof I have hereunto set my hand.

E. PETER JONES.